US009360568B2

(12) United States Patent
Montemont et al.

(10) Patent No.: US 9,360,568 B2
(45) Date of Patent: Jun. 7, 2016

(54) METHOD FOR PROCESSING DATA DERIVED FROM AN IONIZING RADIATION DETECTOR

(75) Inventors: Guillaume Montemont, Grenoble (FR); Thomas Bordy, Fontaine (FR); Eric Gros D'Aillon, Vourey (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 473 days.

(21) Appl. No.: 12/898,639

(22) Filed: Oct. 5, 2010

(65) Prior Publication Data

US 2011/0082659 A1 Apr. 7, 2011

(30) Foreign Application Priority Data

Oct. 7, 2009 (FR) ...................................... 09 56992

(51) Int. Cl.
| | |
|---|---|
| G01D 18/00 | (2006.01) |
| G01T 1/29 | (2006.01) |
| G01T 7/00 | (2006.01) |
| G01T 1/24 | (2006.01) |
| G01T 1/17 | (2006.01) |

(52) U.S. Cl.
CPC ................ *G01T 1/2928* (2013.01); *G01T 7/005* (2013.01); *G01T 1/17* (2013.01); *G01T 1/247* (2013.01)

(58) Field of Classification Search
USPC ........... 702/38, 40, 52, 64, 85, 104, 134, 172, 702/180, 181
See application file for complete search history.

(56) References Cited

U.S. PATENT DOCUMENTS

| | | | |
|---|---|---|---|
| 5,825,033 A * | 10/1998 | Barrett et al. .............. 250/370.1 |
| 5,854,489 A | 12/1998 | Verger et al. |
| 6,002,741 A | 12/1999 | Eisen et al. |
| 6,169,287 B1 | 1/2001 | Warburton |

FOREIGN PATENT DOCUMENTS

| | | |
|---|---|---|
| DE | 19721323 A1 | 11/1998 |
| EP | 1037070 A1 | 9/2000 |
| EP | 1058128 A1 | 12/2000 |
| EP | 1004040 B1 | 1/2003 |
| EP | 1598680 A2 | 11/2005 |
| EP | 1739456 A1 | 1/2007 |
| WO | 9500073 A1 | 1/1995 |
| WO | 2007/144589 A2 | 12/2007 |

OTHER PUBLICATIONS

French Search Report in French Patent Application No. FR 0956992, dated Jul. 1, 2010.

(Continued)

*Primary Examiner* — Paul D Lee
(74) *Attorney, Agent, or Firm* — Nixon Peabody LLP; Khaled Shami

(57) ABSTRACT

Measurements of electric charges obtained by the impact of ionizing radiation on a semiconductor detector are grouped in a histogram. Calibrations and data otherwise obtained are used to obtain acceptance probabilities of measurements, which are used to construct a histogram of events by weighting the measurements so as to exclude the influence of some factors (such as diffused radiation) or on the contrary to enhance this influence.

9 Claims, 6 Drawing Sheets

(56) References Cited

OTHER PUBLICATIONS

Montemont et al., "CZT Pixel Detectors for Improved Spect Imaging," 2008 IEEE Nuclear Science Symposium Conference Record; NSS '08; IEEE (Oct. 19-25, 2008), Piscataway, New Jersey, pp. 84-89; XP031419399.

Warburton, W.K., "An Approach to Sub-Pixel Spatial Resolution in Room Temperature X-Ray Detector Arrays With Good Energy Resolution," Materials Research Society Symposium Proceedings, vol. 487, 1997, pp. 531-536.

Kim et al., "Three-Dimensional Signal Correction on UltraPeRL CZT Detectors", 2007 IEEE Nuclear Science Symposium Conference Record, 2007, NSS'07; IEEE, pp. 1289-1293.

* cited by examiner

METHOD FOR PROCESSING DATA DERIVED FROM AN IONIZING RADIATION DETECTOR

CROSS REFERENCE TO RELATED APPLICATIONS OR PRIORITY CLAIM

This application claims priority of French Patent Application No. 09 56992, filed Oct. 7, 2009.

FIELD OF THE INVENTION

The present invention pertains to a method for processing data derived from a detector of ionizing radiation, and more particularly a detector in semiconductor material polarized by at least two electrodes arranged either side of the volume formed by this detector.

It can find use inter alia in nuclear medicine, scintigraphy, single photo emission tomography (SPET) and in general in all methods in which radiation produces interactions, or events, in the detector which it is sought to discriminate through the recording thereof so as to determine a histogram of these events in relation to their characterizing parameters. The parameters may be of varied type. One common example however is the image of an object from which the radiation emanates, the parameters of the histogram then being geometric coordinates. The points in the histogram express the measured numbers or densities of occurrence of these events for corresponding values of the parameters.

BACKGROUND

Ionizing radiation is measured by gamma cameras or similar devices comprising semiconductor sensitive elements in which the radiation is converted into induced electric charges, represented by electrons or holes in the semiconductor material. Polarization electrodes are added to attract these charges, and measurements comprise the recording of certain parameters of the pulsed signals produced by the electrodes. These pulsed signals result from the movement and possible collection of charge carriers by an electrode. The movement of a charge carrier relative to an electrode may induce a charge in the latter, without said charge carrier necessarily being collected by this electrode. This is the case for example when a charge carrier moves in the vicinity of an electrode insulated from the semiconductor material by an insulating layer. With collector electrodes, it is possible to measure collected charges and induced charges.

According to the prior art, the interactions of electromagnetic or ionizing particles in a semiconductor material generate electric signals at the electrodes connected to the detector material. By connected is meant a direct link, the electrode being in contact with the semiconductor material, or a capacitive link of the electrode then being separated from the semiconductor medium by a thin layer of dielectric material. The signals measured by the electrodes are then processed and recorded over a certain period, called an acquisition period, to form a measurement spectrum. Single-dimension spectra are frequently used, these spectra corresponding to a histogram of the amplitude of the charges collected by one or more collector electrodes over a determined period of time.

However, measurement suffers from imperfections due in particular to the imperfect transport properties of the electrons and holes in the semiconductor material. The measurement of an event therefore depends inter alia on the pathway of the generated charges and on the site from which the event derives. It has already been envisaged to correct biparametric spectra to take these disparities into account and obtain a more accurate histogram of events. The correction methods may be based on correlations between the amplitude and duration of a pulse to correct their characteristic parameters in accordance with certain criteria.

These methods use biparametric spectra according to which each point in the histogram corresponds to an interaction, or event, classified for example according to the amplitude of a pulse collected by an electrode, and to the duration of said pulse. A colour code is used to identify the number of occurrences at the different points of the histogram during the acquisition period. The utility, the construction and the processing of said biparametric spectra are described for example in U.S. Pat. No. 5,854,489, EP 0 703 751, 1 058 128, 1 004 040 and 1 598 680.

Patent EP 1 037 070 describes how to use this biparametric spectrum: calibration of the detector is used according to radiation of given energy to obtain a scalar which corresponds to a number of events in a given energy window.

Yet another cause of imperfection is the sharing of charges when one of the electrodes, generally the anode, is segmented into elementary electrodes each assigned to a different detection, which is very frequently chosen when it is desired to have an additional indication on the location of the charges, and hence on the origin of the radiation: the cloud of charges produced by a particle is often spread quite broadly to influence several of the elementary electrodes which each measure a fraction of the signal produced by the event; the energy resolution of the measurements is reduced and some ionizing particles escape detection. One mode to detect and correct these errors is given in EP 1 739 456.

Other methods make particular use of the measurements to fine-tune locating of the radiation source. Mention can be made of U.S. Pat. Nos. 6,002,741, 6,169,287, the article by Warburton "An approach to sub-pixel spatial resolution in room temperature x-ray detector arrays with good energy resolution", Materials Research Society Symposium proceedings, vol. 487, 1997, pp. 531-536 and the article by Jaecheon Kim et al., "Three-dimensional signal correction on UltraPeRL CZT detectors", Nuclear Science Symposium Conference Record, 2007. NSS'07.IEEE, pp. 1289-1293. However, these methods are also insufficient, notably because in general they are dedicated to the correction of a single cause of perturbation and are therefore only suitable for certain measurement situations, or because they give incomplete localization.

BRIEF DESCRIPTION

The object of the invention is to improve these methods for the processing of electric signal data representing radiation, to obtain improved histograms of events with a method that is both simple and has more universal use than the other correction methods mentioned above, so that it is possible simultaneously to tackle several causes of measurement perturbation, irrespective of the parameters used to define measurement spectra and events.

The invention concerns a method for processing data derived from a semiconductor detector of electromagnetic or ionizing radiation, said detector having at least two polarization electrodes producing electric signals under the effect of an interaction, or an event, of said radiation in said detector, each interaction able to be characterized by at least one parameter based on measurements of the electric signals so as to construct a histogram of events, comprising the determination of a set of event acceptance probabilities, and the histogram of events being corrected in accordance with the set of acceptance probabilities, documents WO-A-2007/144589 and DE-A-197 21 323 give known examples of this family of methods.

Acceptance probabilities only depend on the type of radiation which produced the event and are determined independently of the measurements which give rise to the histogram of events, optionally before these measurements. The simplest way to weight measured events consists of multiplying the histogram of events point by point with their respective acceptance probabilities. These allow weighting of the importance it is desired to assign to each event in relation to its coordinates in the histogram.

This weighting can also be performed by allocating a weight factor to each event in relation to its characterizing parameters, before or during the construction of the histogram.

According to the invention, the acceptance probabilities are obtained by dual calibration in which the detector is irradiated with radiations which differ in an acceptance criterion of events; it is then easy to discriminate the influence of this criterion even without having full knowledge of its effects.

It will then be possible to determine the acceptance probability P(S/X) of an event (X) on the basis of a probability of the radiation acceptance criterion (S), equal to $$\frac{P(X/S) \cdot P(S)}{P(X)},$$

where P(X/S) corresponds to the probability of occurrence of event X for radiation always having criterion (S) in the first calibration, P(S) corresponds to the probability of criterion (S) in the second calibration and P(X) corresponds to the probability of occurrence, or distribution, of the event (X) in the second calibration.

Results derived from theoretical knowledge or from hypotheses may also complete a calibration.

The invention can be applied to numerous situations. The parameters characterizing events may be extracted from the charge signals measured by electrodes chosen from among:
  at least one cathode;
  the anode which collected the highest charge;
  the group of anodes which collected charge carriers;
  the group of anodes adjacent to those which collected the charge carriers;
  all the anodes.

From the signals produced by one of the groups of electrodes listed above, the following can be extracted:
  final values, such as final value Q of a typical signal in FIG. 8;
  transitional values (e.g. maximum or minimum values or a value at a given time);
  combinations of values measured at different instants (e.g. excursions corresponding to a difference between a maximum value and minimum value of a transient signal of which one illustration is another typical signal in FIG. 9, in which the excursion is indicated between the extreme values $Q_{max}$ and $Q_{min}$;
  values which correspond to a temporal magnitude, for example durations lasting between the start and end of pulses (rise time).

The values measured by different electrodes can be combined to form a parameter. For example a parameter may correspond to a value measured by one electrode, or to a combination of values measured by one or more electrodes. It is possible for example to sum the values measured by several electrodes, to extract the highest or to determine a barycentre thereof, i.e. the sum of the coordinates of some electrodes weighted with the values extracted from these electrodes.

By measured charge is meant a collected charge (when the electrode is a collector electrode) or an induced charge (when the electrode is not a collector electrode) or, with a collector electrode, the addition of collected and induced charges.

Therefore, depending on cases, each interaction can be represented in a space with n dimensions, n being the number of parameters characterizing the interaction. A detected interaction corresponds to an event with coordinates (x1, x2, ... xn) in this space. An example of an event graph is given in FIG. 1, to which we will come back to later. For each of the events, the parameters are the total electric charge measured on an anode, the total electric charge measured on the common cathode, and the total charge measured on adjacent anodes. In this case, the detector is polarized by a single cathode arranged opposite a plurality of segmented elementary anodes. FIG. 6 illustrates another example, in which the event parameters are the total charge QA received by the anode which collected the most charges, the total charge QK received by the cathode, and the coordinates X and Y of the barycentre obtained by summing the coordinates of the electrodes adjacent to the electrode which collected the most charges in relation to the centre of this latter electrode, weighted with the charge excursion values measured on these adjacent electrodes. FIG. 6 is in fact a projection along Y of this four-parameter spectrum which cannot be illustrated by a single figure; the complete spectrum would be a collection of these projections at different values of Y. In general, an acquisition corresponds to the recording of several interactions over a determined time period. During an acquisition, conventionally a histogram is constructed which, for each point in space of the parameters, represents the number of measured events corresponding to these parameters. If the number of parameters is 2 or 3, it is usual to use a color code for all the spatial points, matching a given color with the number of measured events corresponding to the parameters defined by these points.

The criteria governing the acceptance probabilities of an event, whose influence must either be removed or on the contrary enhanced depending on cases, may be:
  homogeneity defects in the detection of an ionizing charge;
  its origin i.e. the location where it was generated;
  the type of radiation, this possibly being diffused or direct;
  the spatial expanse of the source;
  the sharing of charges created by an interaction between elementary electrodes;
  radiation energy;
  the isotope or isotopic composition of the source; etc.

One same set of measurements may be assigned several series of acceptance probabilities to isolate any part of the radiation.

DESCRIPTION OF THE DRAWINGS

The invention is now described in connection with the following figures.

DETAILED DESCRIPTION

Figure 5:
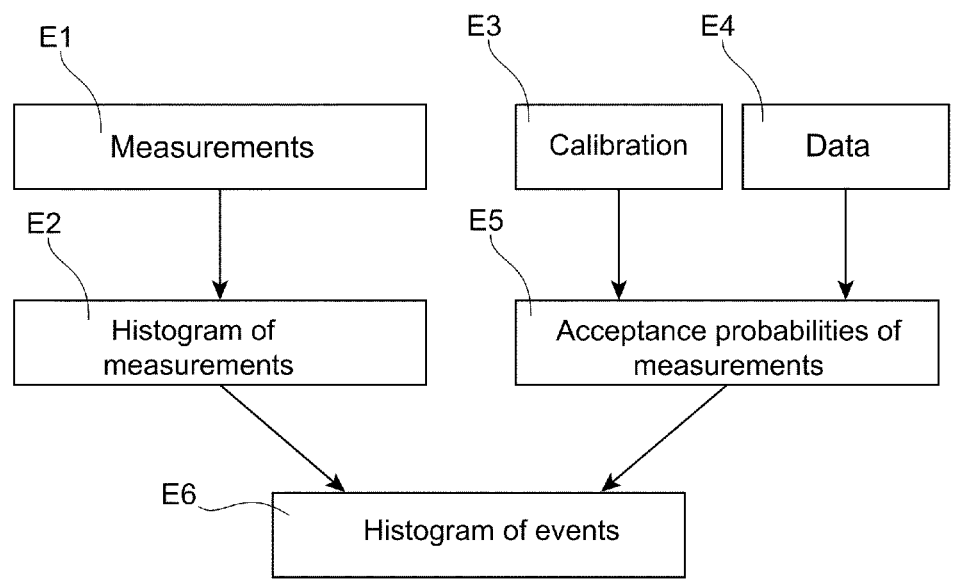
FIG. 5 is a summary flow chart of the invention,
  FIG. 6 gives another example of a histogram of events.
Figure 6:
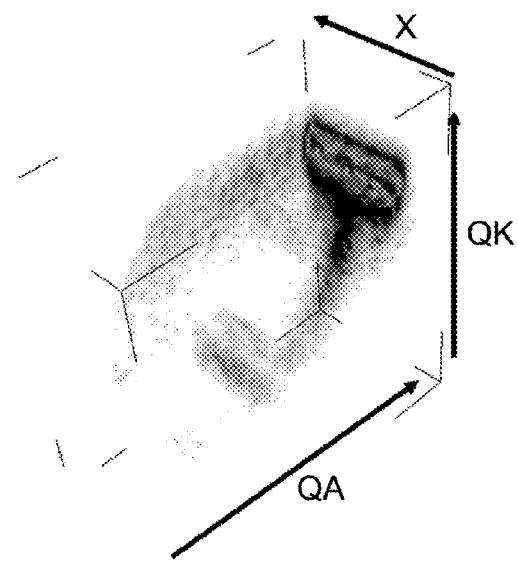

First, a description is given of FIG. 5. The method, after taking measurements (step E1) and constructing a histogram of events (E2) as is conventional as per one or preferably at least two of their parameters, may comprise the performing of at least one calibration (E3), to which additional data may be added (E4), to deduce acceptance probabilities for each measurement (E5), generally in the form of a set coherent with the histogram of measured events or events to be measured. By coherent is meant that acceptance probabilities are determined for events having at least one parameter in common with the parameters taken into consideration when taking measurements. Combining the events and these probabilities, generally using weighted calculations, gives a new histogram of events (E6) in which the errors affecting the measurements have been corrected. Calibration (E3) for the deducing of acceptance probabilities can be performed before or after the measurements. It is an independent operation performed under particular calibration conditions as will be seen in the examples.

Figure 4:
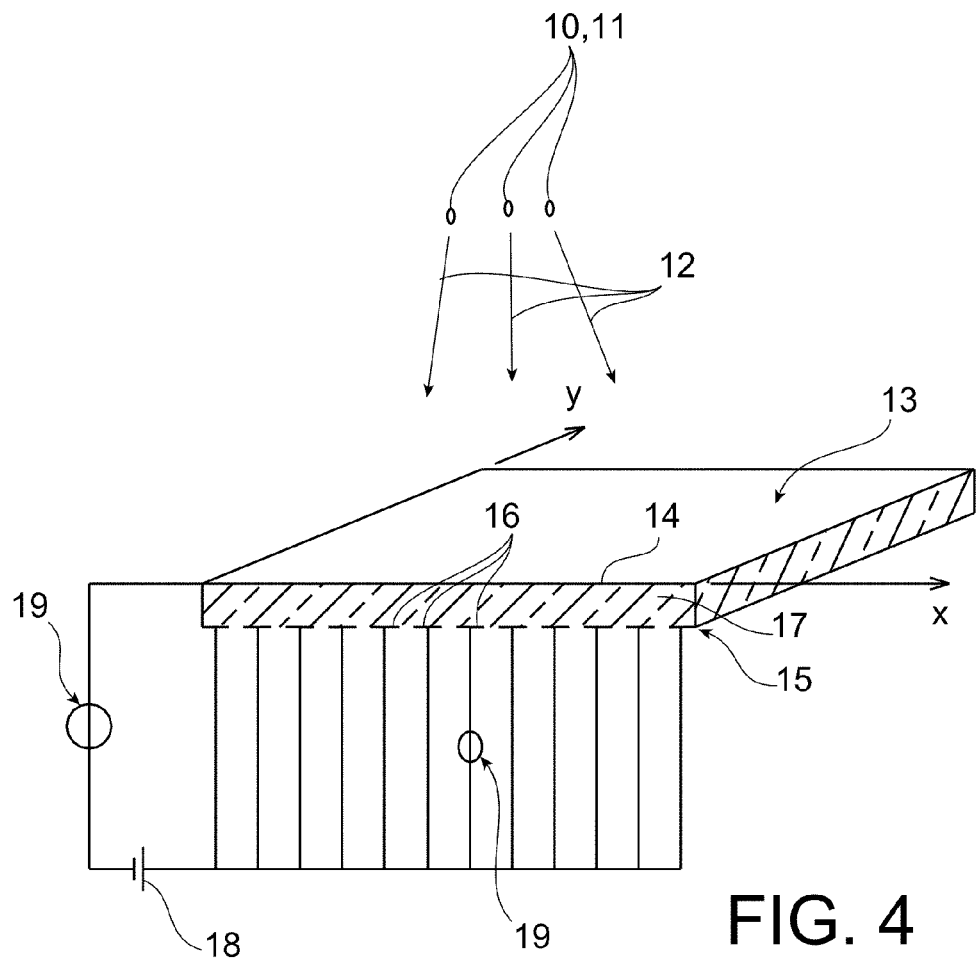
FIG. 4 illustrates a measuring device.

An example of a measurement device according to the invention is illustrated in FIG. 4. One or more sources 10 and 11 emit radiation 12 towards a detector 13 comprising a continuous cathode 14, an anode 15 divided into adjacent elementary anodes 16, a layer of semiconductor material 17 inserted between the cathode 14 and the anode 15, a direct voltage generator circuit 18 between the cathode 14 and the anode 15, and current measurement devices 19 for each of the elementary anodes 16 (only one device is shown). These devices 19 are sensitive to the electric charges which are generated during interactions or events in the semiconductor material 17 on impact of a radiation particle 12 and are attracted towards the anode 15 or the cathode 14 depending on their sign. The elementary anodes 16 allow the locating of charges in the plane of the detector 13 along coordinates (x,y).

Some examples of an embodiment of the invention are now given.

EXAMPLE NO. 1

It is sought here to eliminate diffused radiation for a CZT (or CdZnTe) detector in a situation in which sharing of charges between elementary anodes adjacent to the electron-collector anode may occur. The histogram of events may be a function of three parameters:
- the final charge QA (total electric charge during the arrival time of the particles) measured at the anode under consideration for an event, this anode being the anode whose final charge QA is the highest,
- the final charge of the cathode QK (corresponding to the algebraic charge measured on all the anodes, taking in consideration the sign);
- the sum of the final charges ΣQ measured on the collector anodes adjacent to the anode under consideration.

Figure 1:
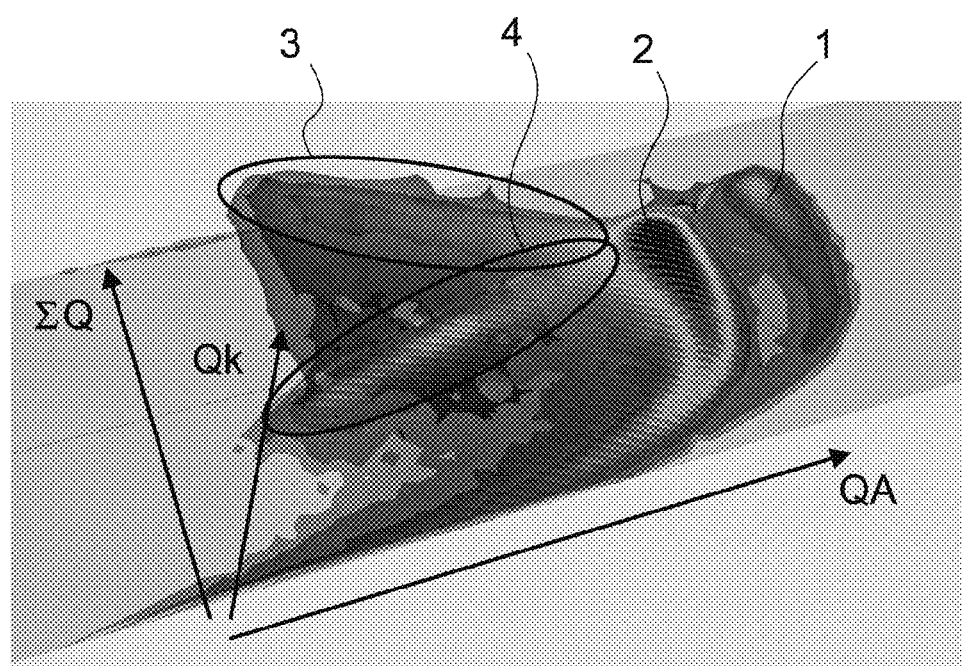
FIG. 1 is a histogram of events shown in three dimensions.
Figure 2:
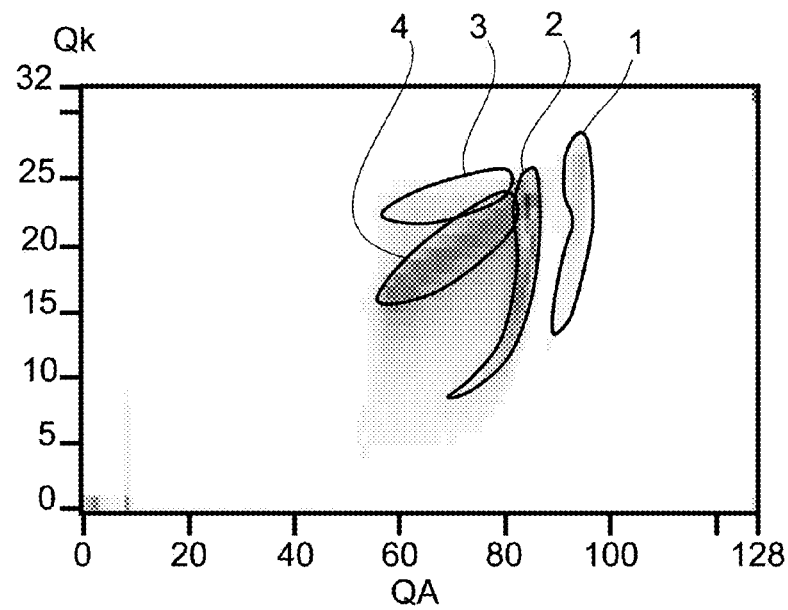
FIG. 2 is a two-dimensional cross-section of this histogram.

FIG. 1 shows a three-dimensional histogram of events and FIG. 2 shows a cross-section of this histogram for a fixed value of the third parameter (ΣQ). The values of the histogram correspond to numbers or densities of events at the coordinates under consideration. Four main points of measurement can be seen of which the first two 1 and 2 correspond to irradiations produced by groups of particles having different energies, point 3 corresponds to charges shared between different elementary anodes and point 4 to charges resulting from diffused radiation whose influence is to be removed.

This is achieved through calibration operations. A first calibration consists of causing the detector to measure the radiation derived from a source in the full absence of diffused radiation. A bare source meets this criterion. A histogram is obtained founded on the same parameters as those in FIG. 1 but whose point values are denoted P(X/S), expressing the events by probabilities P of value X in the presence of the character S (no diffused radiation).

During a second calibration, the same source, or optionally a different source, is placed in a situation in which it emits a large quantity of diffused radiation, for example immersed in water, and its radiation is measured by its detector to give another histogram denoted P(X). This second calibration generally corresponds to an acquisition situation during which P(S) is controlled.

There remains to determine the proportion of non-diffused radiation arriving at the detector, denoted P(S), during this second calibration. This can be done via simulation using a Monte-Carlo method, or experimentally. This second calibration may correspond to an acquisition situation during which P(S) is controlled.

Next, an acceptance probability is calculated for each event in the histogram in FIG. 1, denoted P(S/X), using the formula $$P(S/X) = P(X/S) \times \frac{P(S)}{P(X)}.$$

In fact a conventional, conditional Bayes formula of probabilities is used whose result is a new histogram that is a function of the same parameters as in FIG. 1.

Figure 3:
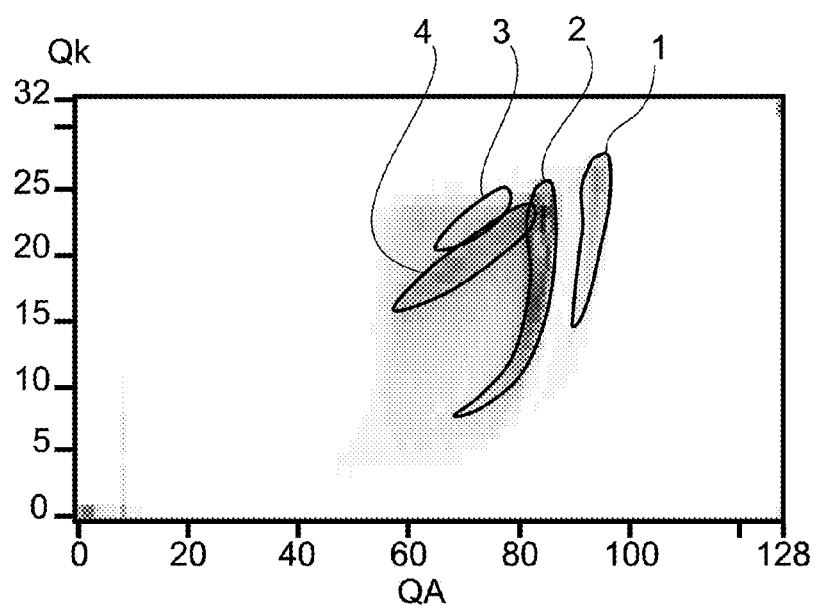
FIG. 3 is the same cross-section after application of the invention.

The final step of the method consists of weighting the histogram in FIG. 1 with all the acceptance probabilities, i.e. determining their product point by point. If calibration has been suitably performed, the acceptance probabilities are very low at point 4 in the histogram in FIG. 1, which substantially reduces its content in the histogram finally obtained (the one in FIG. 3) and therefore enhances the events recorded at points 1, 2 and 3. Evidently, this weighting could be performed as and when the measurement histogram is constructed, by assigning to each event a weighting factor dependent on one or more parameters characterizing the event.

It is possible to complicate this example by considering two sources of indices 1 and 2 delivering single-energy radiation whose energy is respectively E1 and E2. The sought character S may correspond to a situation S=S1 in which the energy of the radiation to be measured is equal to E1, and S=S2 in which the energy of the radiation to be measured is equal to E2. The calibration steps described previously are then performed separately with a radiation source of energy E1 and a radiation source of energy E2. Two groups of acceptance probabilities P(S=S1/X) and P(S=S2/X) are thereby deduced using similar formulas $$P(S = S1/X) = P(X/S = S_1) \times \frac{P(S = S_1)}{P(X)},$$

and the same for S=S2. By multiplying the experimental histogram by each acceptance probability histogram thus obtained, it is possible to enhance the measurements corresponding to energy E1 and those corresponding to energy E2, which can help distinguish between points 1 and 2 in the case shown in FIG. 1.

This situation will be particularly useful for multi-isotopic acquisition in nuclear medicine, using $^{99m}Tc$ and $^{123}I$ for example.

From the experimental histogram obtained, it is possible to establish an estimation $\tilde{S}$ of a histogram of which each element $\tilde{S}_j$ forms an estimation of the number of detected photons meeting criterion j. In this example, the criterion j corresponds to the fact that the photon derives from a source emitting a photon of energy and the fact that this photon was not diffused before its interaction in the detector material.

The value of this estimation $\tilde{S}_j$ is obtained by the following equation:

$$\tilde{S}_j = \sum_i P(S_j / X_i) X(i)$$

where:
$\tilde{S}_j$=estimation of the number of detected photons meeting criterion j,
$P(S_j/X_i)$=acceptance probability of an event with coordinates i in the histogram, knowing criterion j,
$X(i)$=value of the point with coordinates i in the measured experimental histogram. In this example, the index i represents the coordinates (QA, QK, ΣQ) of the detected event.

Figure 7:
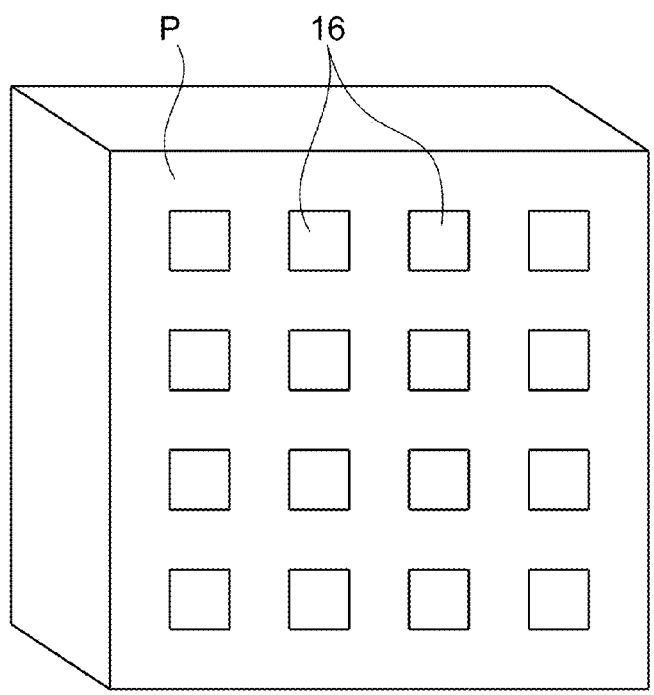
FIG. 7 illustrates a detector.
Figure 8:
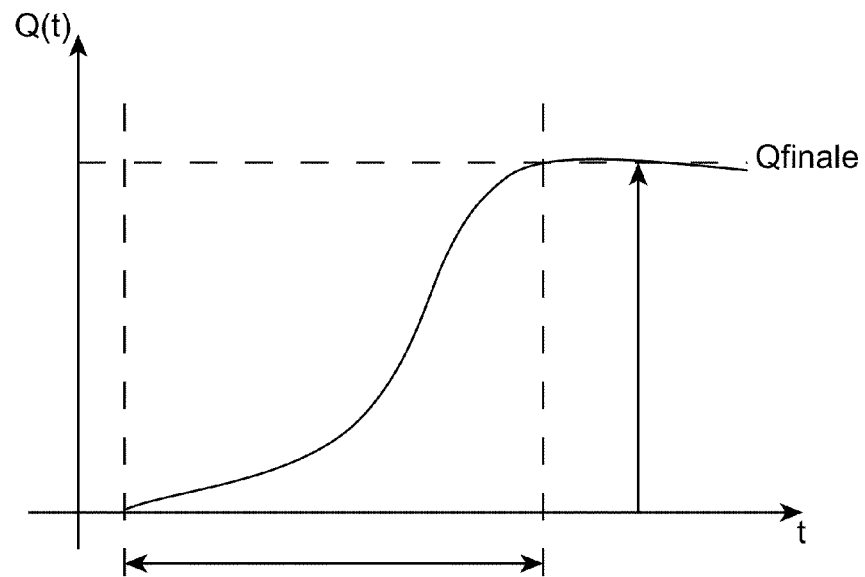
FIGS. 8 and 9 show signal plots.
Figure 9:
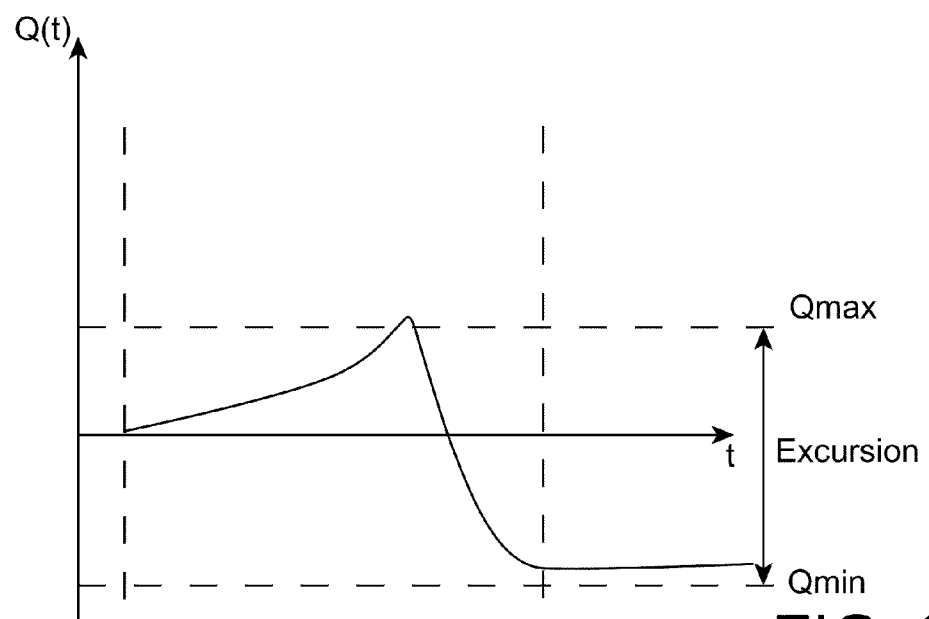

EXAMPLE NO. 2 here the purpose is to locate interactions in the detector. For this purpose, the parameters of each interaction are the coordinates, along plane P, of the barycentre of the different signals measured by the elementary anodes, weighted with their charge excursion. Plane P here corresponds to the plane parallel to the electrodes. This is illustrated in FIG. 7.

The histogram of events is therefore a diagram defined by the coordinates (xB, yB) of the barycentre.

The calibration step consists of constructing n.p histograms by moving a collimated source to n.p known positions in the field of vision (n in one direction, and p in the other), using a narrow collimator compared with the size of the electrodes. Therefore, the position of the interaction in plane P is directly obtained from the position of the collimated source. This histogram corresponds to P(X/S), where X designates the coordinates (xB and yB) of the barycentre of the different signals measured by the elementary anodes, S is the position of the source in the same plane, here the plane of the cathode and that of the anode formed by coplanar elementary anodes i.e. a set of coordinates (x, y).

The second calibration step consists of measuring the radiation derived from a spread-out uniform source, which gives a histogram P(X) corresponding to the superimposition of n.p sources respectively present at every sampling point (n in one direction, and p in the other), whose number is arbitrary.

The acceptance probabilities of results for the presence of a source with coordinates (x,y) are written P(S(x,y)/X), and as previously they are equal to $$P(S(x, y)/X) = \frac{P(X/S(x, y)) \times P(S)}{P(X)}.$$

In this manner, n.p histograms of acceptance probabilities are calculated, one for each of the potential positions of the source, these histograms being used by multiplying them successively with the histogram of measurements: the better the correlation between the measurement histogram and one of the acceptance probability histograms i.e. the greater the size and number of their coefficient products distinctly different from 0, the more it can be assumed that the experimental source has a position close to the calibration source associated with these acceptance probabilities. Correlation calculations can be performed using known methods.

From the experimental histogram obtained, it is possible to determine an estimation $\tilde{S}$ of a histogram of which each element $\tilde{S}_j$ forms an estimation of the number of detected photons meeting criterion j. In this example, the criterion j corresponds to the fact that the photon derives from the position of the coordinates j in the field of vision. Here, the coordinates j comprise the position of the source in the plane of the cathode and anode. Therefore the histogram $\tilde{S}$ is a two-dimensional histogram. It can be used to determine the position of the source, the source corresponding to the coordinates j for which the value(s) $\tilde{S}_j$ have the highest values.

The value of this estimation $\tilde{S}_j$ is obtained with the following equation:

$$\tilde{S}_j = \sum_i P(S_j / X_i) X(i)$$

where:
$\tilde{S}_j$=estimation of the number of detected photons meeting criterion j, j then representing the coordinates of the source in the plane under consideration,
$P(S_j/X_i)$=acceptance probability of an event with coordinates i in the histogram, knowing criterion j,
$X(i)$=value of the point of coordinates i in the measured experimental histogram. In this example, i represents the coordinates $(X_B, Y_B)$ of the barycentre, previously defined, of the different signals.

It will be understood that when the calibration is performed by moving the source in three dimensions, a three-dimensional histogram $\tilde{S}$ can be obtained whose value of each point $\tilde{S}_j$ related to the probability that the coordinate j contains the observed source.

EXAMPLE NO. 3 this concerns the combination of the two preceding examples: it is sought to determine the position of the interaction in the plane of the detector, whilst setting aside the contribution of diffused radiation, the whole forming criterion S. The histograms of events may comprise four parameters: total charge at the anode which collected the maximum charges, total charge at the cathode, and the two coordinates of the barycentre of charges. By barycentre of charges is meant the point of the plane of the segmented electrodes determined by calculating the barycenter of the elementary electrodes weighted with the charge excursion measured by each thereof.

To obtain P(X/S), the n.p histograms are acquired with a finely collimated point source, whose position is known. To obtain P(X), a similar histogram is obtained with a spread-out uniform source, generating a quantity of diffused radiation representing the true acquisition conditions. P(S) is known as in Example No. 1, by estimation of the diffused radiation. The estimation of the position of the source is made using the same correlations as in Example No. 2.

From the experimental histogram obtained, it is possible to determine an estimation $\tilde{S}$ of a histogram of which each element $\tilde{S}_j$ forms an estimation of the number of detected photons meeting criterion j. In this example, the criterion j corresponds to the fact that the photon derives from a source emitting a photon of energy j and that this photon was not diffused before its interaction in the detector material.

The value of this estimation $\tilde{S}_j$ is obtained with the following equation:

$$\tilde{S}_j = \sum_i P(S_j/X_i)X(i)$$

where:
$\tilde{S}_j$=estimation of the number of detected photons meeting criterion j. In this example, criterion j is the fact that the photon derives from a given position (x=n. y=p), without being diffused before interacting in the detector,
$P(S_j/X_i)$=acceptance probability of an event with coordinates i in the histogram, knowing criterion j,
$X(i)$=value of the point with coordinates i in the measured experimental histogram. In this example, i represents the coordinates ($QA$, $QK$, $X_B$, $Y_B$) of the detected event.

Therefore, according to one embodiment, the invention is a method for processing data measured by a detector, comprising the following steps:
an experimental histogram X is determined, classifying each detected event as per a coordinate i, i representing measured parameters characterizing the event. The value of the histogram at coordinate i is denoted $X(i)$: it corresponds to the number of events detected at this coordinate;
for the points of coordinates i in the histogram, an acceptance probability $P(S_j/X_i)$ is determined, indicating the probability of detecting an event at coordinate i when the source meets criterion j;
an estimation of a histogram $\tilde{S}$ is determined, of which each point $\tilde{S}_j$ represents an estimation of the number of detected rays meeting criterion j.

The invention claimed is:

1. A method for characterizing a source of electromagnetic or ionizing radiation having a criterion j, the method comprising:
impinging the electromagnetic or ionizing radiation onto a detector having at least two polarization electrodes, including an anode and a cathode;
generating electrical signals based on said impinging under effect of an interaction of said radiation in said detector, each interaction being characterized by a set of n parameters i=($x_1$ ... $x_n$) on the basis of measurements of said electric signals; using a processor to:
determine an n dimensions measurements histogram X, said measurements histogram X comprising terms $X(i)$, the value of each term $X(i)$ corresponding to the number of detected interactions with a set of parameters i,
for each term $X(i)$ of coordinates i within said measurements histogram X, determine an acceptance probability $P(S_j/X_i)$, indicating the probability of a source meeting said criterion j when an interaction with parameters i is detected, and
convert said measurements histogram X to a corrected histogram by using said each acceptance probability $P(S_j/X_i)$ as weighting factors with respect to each term $X(i)$ of said measurements histogram X; and
generating an image characterizing said source based on the corrected histogram;
wherein said acceptance probability $P(S_j/X_i)$ is calculated during a calibration phase, said calibration phase including:
the acquisition of a first calibration histogram $P(X/S_j)$, said first calibration histogram recording interactions measured as the detector is irradiated with a calibration source S, said calibration source meeting criterion j,
the acquisition of a second calibration histogram $P(X)$, said second calibration histogram recording interactions measured as the detector is irradiated with a calibration source S meeting the criterion j with a probability $P(S)$,
wherein the calibration phase includes moving the calibration source in front of the detector for obtaining one of the calibration histograms, and/or interposing an intermediate medium between the calibration source and the detector for obtaining one of the calibration histograms, and
wherein said acceptance probability $P(S_j/X_i)$ being derived from said first calibration histogram $P(X/S_j)$ and said second calibration histogram $P(X)$ considering the values $P(X_i/S_j)$ and $P(X_i)$ of each first and second histogram at coordinates i.

2. The method according to claim 1, wherein said radiation source criterion j includes:
a set of coordinates of said source, or
at least one energy of a radiation emitted by the source.

3. The method according to claim 1, wherein said radiation source criterion j includes both:
a set of coordinates of said source, and
at least one energy of a radiation emitted by the source.

4. The method according to claim 1, wherein processing said measurements histogram X includes multiplying, term by term, each term $X(i)$ of said measurements histogram X by acceptance probabilities $P(S_j/X_i)$ indicating the probability of detecting an interaction with parameters i when the source meets a criterion j.

5. The method according to claim 1, wherein said acceptance probability $P(S_j/X_i)$ is obtained by:
multiplying said value $P(X_i/S_j)$ of said first calibration histogram by said probability $P(S)$,
dividing the resulting term $P(X_i/S_j) \times P(S)$ by the said value $P(X_i)$ of second calibration histogram.

6. The method according to claim 1, further including:
for each source criterion j, generating a corrected histogram by using each acceptance probability $P(S_j/X_i)$ as a weighting factor of each value $X(i)$ of said measurement histogram X
generating an histogram $\tilde{S}$, each term $\tilde{S}_j$ of which is calculated by summing all values of said corrected histogram with respect to source criterion j,
so that each term $\tilde{S}_j$ of histogram $\tilde{S}$, is an estimation of the number of detected radiation meeting criterion j.

7. The method according to claim 1, further including:
for each source criterion j, generating a corrected histogram by multiplying, term by term, each term $X(i)$ of said measurements histogram X by an acceptance probability $P(S_j/X_i)$
generating an histogram $\tilde{S}$, each term $\tilde{S}_j$ of which is calculated by summing all values of said corrected histogram with respect to source criterion j, each term $\tilde{S}_j$ being such that:

$$\tilde{S}_j = \sum_i P(S_j/X_i)X(i)$$

so that each term $\tilde{S}_j$ of histogram $\tilde{S}$ is an estimation amount of detected radiation meeting criterion j.

8. A method for detecting electromagnetic or ionizing radiation from a radiation source having a criterion j, the method comprising:

impinging the electromagnetic or ionizing radiation onto a detector having at least two polarization electrodes, including an anode and a cathode;

generating electrical signals based on said impinging under effect of an interaction of said radiation in said detector, each interaction being characterized by a set of n parameters $i=(x_1 \ldots x_n)$ on the basis of measurements of said electric signals; and using a processor to:

a) determine an n dimensions measurements histogram X, said measurements histogram X comprising terms X(i), the value of each term X(i) corresponding to the number of detected interactions with a set of parameters i;

b) for each term X(i) of coordinates i within said measurements histogram X, determine an acceptance probability $P(S_j/X_i)$, indicating the probability of a source meeting said criterion j when an interaction with parameters i is detected; and c) generate a corrected histogram $\tilde{S}$, each term $\tilde{S}_j$ of said histogram $\tilde{S}$ being such that $\tilde{S}_j = \Sigma_i P(S_j/X_i) X(i)$, each term $\tilde{S}_j$ being an estimation of the amount of detected radiation meeting criterion j;

d) use the corrected histogram to provide an indication of the source;

wherein said acceptance probability $P(S_j/X_i)$ is calculated during a calibration phase, said calibration phase including:

the acquisition of a first calibration histogram $P(X/S_j)$, said first calibration histogram recording interactions measured as the detector is irradiated with a calibration source S, said calibration source meeting criterion j, the acquisition of a second calibration histogram $P(X)$, said second calibration histogram recording interactions measured as the detector is irradiated with a calibration source S meeting the criterion j with a probability $P(S)$, wherein the calibration phase includes moving the calibration source in front of the detector for obtaining one of the calibration histograms, and/or interposing an intermediate medium between the calibration source and the detector for obtaining one of the calibration histograms, and wherein said acceptance probability $P(S_j/X_i)$ being derived from said first calibration histogram $P(X/S_j)$ and said second calibration histogram $P(X)$ considering the values $P(X_i/S_j)$ and $P(X_i)$ of each first and second histogram at coordinates i.

9. The method according to claim 8, wherein said acceptance probability $P(S_j/X_i)$ is obtained by:

multiplying said value $P(X_i/S_j)$ of said first calibration histogram by said probability $P(S)$, dividing the resulting term $P(X_i/S_j) \times P(S)$ by the said value $P(X_i)$ of second calibration histogram.

\* \* \* \* \*